Patented July 29, 1952

2,605,267

UNITED STATES PATENT OFFICE 2,605,267

BETA-PYRROLIDYL-ETHYL ESTERS OF PARA-PROPOXYBENZOIC ACID

William Bradley Reid, Jr., Kalamazoo, Mich., assignor to The Upjohn Company, Kalamazoo, Mich., a corporation of Michigan No Drawing. Application May 5, 1949,
Serial No. 91,625

9 Claims. (Cl. 260—326.3)

This invention relates to N-pyrrolidyl-ethyl esters, particularly to beta-(N-pyrrolidyl)-ethyl esters of para-propoxybenzoic acids, and their acid addition salts.

The esters of this invention are represented by the formula:

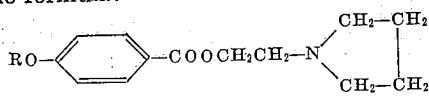

wherein R is a propyl or an isopropyl radical.

The esters are high boiling liquids which are readily soluble in most organic solvents, but are insoluble in water. The acid addition salts, such as the hydrochloride, hydrobromide, sulfate, nitrate, acetate, tartrate and citrate are generally crystalline solids with well defined melting points and are readily soluble in cold water, methanol, or ethanol; moderately soluble in isopropanol, ethyl acetate, or methylethyl ketone; and, insoluble in the common aliphatic, cycloaliphatic and aromatic hydrocarbon solvents.

Members of this new group of compounds have been prepared and found to have value as local anesthetics and as intermediates for the preparation of more complex organic molecules. These compounds are non-irritating and exhibit desirable anesthetic properties, being active when applied either subcutaneously or topically to intact or abraded mucous membrane. The freedom from irritation is unexpected, since beta-(pyrrolidyl-1)-ethyl para-n-butoxybenzoate, the next adjacent homologue, is excessively irritating, rendering it unfit for anesthetic use.

The free basic esters of the invention can be prepared readily by reacting an acid chloride having the formula:

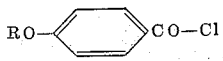

wherein R has the values previously given, with beta-(pyrrolidyl-1)-ethanol. The corresponding acid bromides can also be used, if desired, although the method of preparation will be described with particular reference to the acid chlorides.

The starting acid chlorides can be readily prepared in excellent yield by treating the corresponding acid with thionyl chloride for a period of from one to several hours. The reaction can be carried out conveniently at the refluxing temperature of the mixture. An excess of thionyl chloride is usually employed and the excess subsequently removed by distillation under reduced pressure. The acid chloride, as a residue, is, in general, sufficiently free from impurities to be used without further purification, but fractional distillation can be employed if further purity is desired. Acid bromides can be prepared in a similar manner using thionyl bromide.

The reaction of an acid chloride with beta-(pyrrolidyl-1)-ethanol can be conveniently effected by mixing the two substances together. The mixing is usually carried out in the presence of an inert diluent, such as dry xylene. The reaction usually occurs at ordinary room temperatures (20-25 degrees centigrade) but it can be accelerated and carried substantially to completion by quickly refluxing the mixture for about 30 minutes or longer. Upon cooling the mixture, the hydrochloride of the basic ester generally crystallizes and can be separated from most of the inert diluent, if used, by filtration. The free ester can be recovered and purified by dissolving the crude hydrochloride in water, extracting the solution with a solvent, for example, ether, to remove any remaining inert diluent or other water-insoluble organic substances. The aqueous mixture is then neutralized, as with sodium hydroxide, extracted with ether or other suitable organic liquid, and the extract distilled to remove the solvent. The basic esters so-obtained can be distilled under reduced pressure to purify them further, if desired.

Salts of the basic esters with acids such as hydrochloric, hydrobromic, hydriodic, sulfuric, phosphoric, acetic, succinic, propionic, benzoic, citric, lactic and other acids can be prepared readily by reacting the free ester with the selected acid, preferably in a solvent such as alchol or a mixture of alcohol and ethyl acetate. Upon distilling the solvent, the salt remains as a residue which can be recrystallized from alcohol or other suitable solvent. The salt may be purified by recrystallization from a mixture of ethyl acetate and ethyl alcohol. Salts of hydrochloric acid or citric acid have particularly well-defined crystalline structures. Certain of the polybasic acids, such as citric acid, combine with the amino esters in equimolecular proportions to form the monoamine salts.

Although the preferred method for preparing the compounds of the invention comprises reacting a para-propoxybenzoyl chloride with beta-(pyrrolidyl-1)-ethanol because of the high yield of pure product obtained, it should be pointed out that they can also be prepared in other ways apparent to those familiar with the art. Thus, an alkali metal salt of para-propoxybenzoic acid can be reacted with a suitable beta-(pyrrolidyl-1)-ethyl halide, preferably in a suitable solvent such as ethanol, isopropanol, isopropyl ether or butanol, and the desired ester isolated from the reaction mixture.

One method of preparing the esters and acid addition salts of the present invention will be apparent from the following examples, which are given by way of illustration only and are not to be construed as limiting:

PREPARATION 1.—PARA-N-PROPOXYBENZOYL CHLORIDE

A solution of 676.1 grams of para-n-propoxybenzoic acid and 808.6 grams of thionyl chloride in one liter of benzene was heated under reflux for four hours, concentrated to about 750 milliliters, and the residue distilled under reduced pressure of about 12 millimeters of mercury absolute. There was thus obtained 610.7 grams (82 percent of the theoretical yield) of para-n-propoxybenzoyl chloride boiling at 149–150 degrees centigrade at a pressure of 12 millimeters of mercury absolute.

PREPARATION 2.—PARA-ISOPROPOXYBENZOYL CHLORIDE

Following substantially the procedure given in Preparation 1, 339.2 grams (88.5 percent of the theoretical yield) of para-isopropoxybenzoyl chloride boiling at 149–151 degrees centigrade at a pressure of 15 millimeters of mercury absolute was obtained from 397.3 grams of para-isopropoxybenzoic acid.

*Example 1.—Beta-(pyrrolidyl-1)-ethyl para-n-propoxybenzoate hydrochloride*

A mixture of 9.9 grams of para-n-propoxybenzoyl chloride from Preparation 1 and 50 milliliters of benzene was heated to reflux, and a solution of 5.7 grams of beta-(pyrrolidyl-1)-ethanol in 25 millilters of benzene was added at a substantially uniform rate over a period of ten minutes. The mixture was stirred and heated under reflux for one hour, cooled, and the precipitate which was formed separated by filtration. Upon recrystallization of the crude hydrochloride so-obtained from isopropanol, 11.9 grams of beta-(pyrrolidyl-1)-ethyl para-n-propoxybenzoate hydrochloride melting at 149.5–150.5 degrees centigrade was obtained.

Analysis: Calculated for $C_{16}H_{24}NO_3Cl$ N: 4.47. Found: 4.77.

*Example 2.—Beta-(pyrrolidyl-1)-ethyl para-isopropoxybenzoate hydrochloride*

Following substantially the procedure given in Example 1, 23.6 grams of beta-(pyrrolidyl-1)-ethyl para-isopropoxybenzoate hydrochloride, melting at 133.5–134.5 degrees centigrade, was obtained from 11.5 grams of beta-(pyrrolidyl-1)-ethanol and 19.8 grams of para-isopropoxybenzoyl chloride.

Analysis: Calculated for $C_{16}H_{24}NO_3Cl$ N: 4.47. Found: 4.85.

*Example 3.—Beta-(pyrrolidyl-1)-ethyl para-n-propoxybenzoate*

A solution of 79.5 grams of para-n-propoxybenzoyl chloride in 50 milliliters of benzene was added at a substantially uniform rate over a period of 30 minutes to a boiling solution of 46.1 grams of beta-(pyrrolidyl-1)-ethanol in 500 milliliters of benzene. Heating under reflux was continued for four hours, 500 milliliters of water added and the layers which formed were separated. The aqueous layer was made basic with dilute aqueous sodium hydroxide and extracted three times with 50 milliliter portions of ether. The ether extracts were combined, dried, concentrated to about 100 milliliters and the residue distilled under a reduced pressure of about .03 millimeter of mercury absolute. There was thus obtained 79.8 grams of beta-(pyrrolidyl-1)-ethyl para-n-propoxybenzoate boiling at 155 degrees centigrade at a pressure of 0.03 millimeter of mercury.

Analysis: Calculated for $C_{16}H_{23}NO_3$ N: 5.05. Found: 5.05.

*Example 4.—Beta-(pyrrolidyl-1)-ethyl para-isopropoxybenzoate*

Following substantially the procedure given in Example 3, 19.7 grams of beta-(pyrrolidyl-1)-ethyl para-isopropoxybenzoate boiling at 184–186 degrees centigrade at a pressure of 1.6 millimeters of mercury absolute was obtained from 11.5 grams of beta-(pyrrolidyl-1)-ethanol and 19.8 grams of para-isopropoxybenzoyl chloride.

Analysis: Calculated for $C_{16}H_{23}NO_3$ N: 5.05. Found: 5.10.

Various modifications may be made in the compounds of the present invention without departing from the spirit or scope thereof, and it is to be understood that I limit myself only as defined in the appended claims.

I claim:

1. A member of the group consisting of (a) esters represented by the formula:

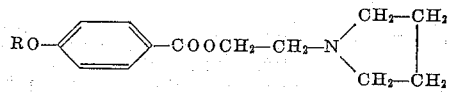

wherein R is an alkyl radical of three carbon atoms and (b) acid addition salts thereof.

2. Esters represented by the formula:

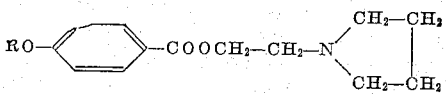

wherein R is an alkyl radical of three carbon atoms.

3. Acid addition salts of esters represented by the formula:

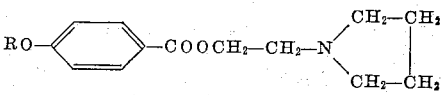

wherein R is an alkyl radical of three carbon atoms.

4. Acid addition salts of beta-(pyrrolidyl-1)-ethyl para-n-propoxybenzoate.

5. Acid addition salts of beta-(pyrrolidyl-1)-ethyl para-isopropoxybenzoate.

6. Beta-(pyrrolidyl-1)-ethyl para-n-propoxybenzoate.

7. Beta-(pyrrolidyl-1)-ethyl para-isopropoxybenzoate.

8. Beta-(pyrrolidyl-1)-ethyl para-isopropoxybenzoate hydrochloride.

9. Beta-(pyrrolidyl-1)-ethyl para-n-propoxybenzoate hydrochloride.

WILLIAM BRADLEY REID, JR.

REFERENCES CITED

The following references are of record in the file of this patent:

UNITED STATES PATENTS

| Number | Name | Date |
| --- | --- | --- |
| 2,081,712 | Rohmann | May 25, 1937 |

OTHER REFERENCES

Blicke et al.: Jour. Amer. Chem. Soc., vol. 53, pp. 1015–1025, (Mar. 1931).

Moore: Jour. Amer. Pharmaceutical Assn., vol. 33, July 1944, Scientific Edition, pp. 193–204.